Oct. 29, 1929.  D. W. DAVIS  1,733,335

ELECTROLYTE CONTROL CARTRIDGE

Filed Dec. 14, 1927

INVENTOR,
Dean W. Davis,

By Minturn & Minturn,
Attorneys.

Patented Oct. 29, 1929

1,733,335

UNITED STATES PATENT OFFICE

DEAN W. DAVIS, OF INDIANAPOLIS, INDIANA, ASSIGNOR, BY MESNE ASSIGNMENTS, TO THOMAS M. HARDY, OF PENDLETON, INDIANA, AND GUSTAV R. SCHNULL, OF INDIANAPOLIS, INDIANA

ELECTROLYTE-CONTROL CARTRIDGE

Application filed December 14, 1927. Serial No. 240,059.

This invention relates to an attachment to a storage or secondary battery having for its purpose the prevention of the escape of water from the electrolyte in the battery cell. This invention provides a small compact unit, herein designated as a cartridge that may be attached to the commonly used battery cell by securing it in the usual vent and filler hole of the cell, without any further change or alteration in the cell being required.

Other objects will become readily apparent in the following description of one form of my invention reference being made to the accompanying drawing in which—

Figure 1:
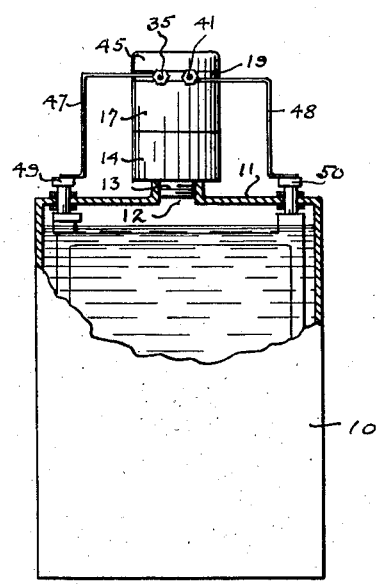
Figure 3:
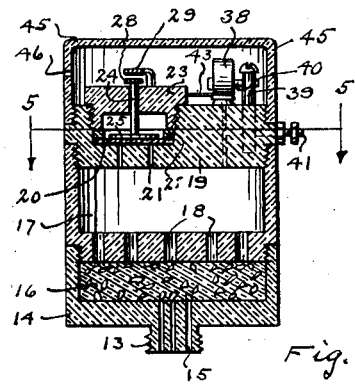
Figure 2:
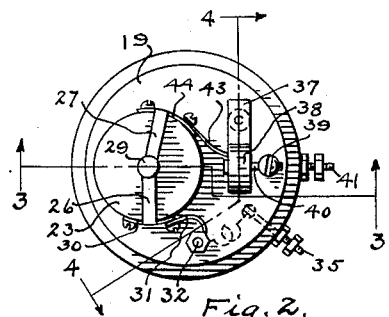
Figure 4:
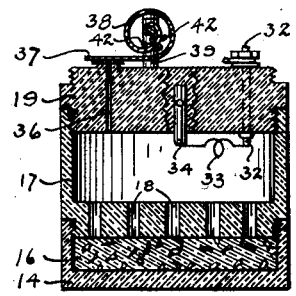

Fig. 1, is a fragmentary side elevation of a secondary battery cell, on a small scale, showing my invention in connection therewith;

Fig. 2, a top plan view of the cartridge with the cover cap removed;

Fig. 3, a vertical section through the cartridge on the line 3—3 in Fig. 2, with the cap in place;

Fig. 4, a vertical section on the line 4—4 in Fig. 2; and

Figure 5:
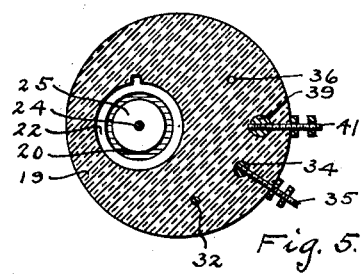

Fig. 5, a transverse section on the line 5—5 in Fig. 3.

Like characters of reference indicate like parts throughout the several views in the drawing.

The usual and well known secondary battery cell 10 as is commonly employed in the modern motor car has a cover 11 closing the cell with a vent and filler hole 12 therethrough. Heretofore a vented plug (not shown) has been screw-threadedly secured in this hole, and the hydrogen and oxygen resulting from the electrolytic action within the cell was permitted to escape through this vented plug, with a consequent final reduction in volume of the electrolyte, a result that necessitated the regular addition of water to the electrolyte to keep the plates covered. If the vent in the plug were closed, a pressure would be built up within the cell by the gases that would cause damage.

I discard this vented plug and screw-threadedly enter in the vent hole 12, the stud 13 which depends from the cupped cartridge base 14, to form a gas tight connection therebetween. The stud 13 has a plurality of passages 15 leading from the under face to discharge into the base 14. Filling the base 14, is a disc of sponge rubber 16, and a detonating or combustion chamber 17 is screw-threadedly received by the base 14 to retain the rubber 16 therebetween. A plurality of passages 18 lead through the bottom of the chamber 17 from above the rubber 16 to discharge into the chamber 17.

A plug 19 screw-threadedly engages within the upper end of the wall of the chamber 17 to form a gas tight enclosure thereover. Entering from the top side of the plug 19 is a depression, across the floor of which is laid a rubber diaphragm 20. A plurality of passages 21 interconnect the under side of this diaphragm with the chamber 17. A ring 22 is pressed downwardly onto the outer edge of the diaphragm 20 and there secured by the screw-plug 23 screw-threadedly engaging in the depression. A rod 24 is slidingly carried in a vertical position by the screw-plug 23 and has a disc 25 affixed thereto at its lower end to rest on and substantially cover the entire area of the diaphragm within the ring 22.

Across the top side of the screw-plug 23 are positioned two spring arms 26 and 27 to carry the contact points 28 and 29, one above the other, whereby the points 28 and 29 are normally separated, but so mounted that an upward push by the rod 24 will carry the point 28 into contact with the point 29. The arm 26 is supported by the base 30 from which leads a wire 31 to the terminal post 32 which passes vertically down through the plug 19 to terminate within the combustion chamber 17.

A short length of resistance wire 33 preferably platinum, is supported within the chamber 17 between the post 32 and a post 34 which also depends from the plug 19. An outside terminal post 35 is entered horizontally from the side of the plug 19 to be in electrical contact with the post 34.

A passage 36, leading from a hole in the under side of the plug 19 having a very small diameter, extends upwardly therefrom to discharge from the upper side of the plug 19, 10 and the discharge end of this passage 36 is normally closed by the horizontally disposed arm 37 extending from the thermostatic spring coil 38 which is supported by the upright post 39. The coil 38 may be adjustably secured to the post 39 by swinging it on its axial support 40 to secure the desired contacting pressure of the arm 37 over the discharge opening of the passage 36.

The post 39 is engaged by the outer terminal post 41 (Fig. 5) to be in electrical circuit therewith, and a short resistance wire 42 having one end in electrical contact with the coil 38 passes around a portion of the coil 38 by a few turns, being insulated therefrom and connects by its other end through the conductor 43 with the base 44 of the arm 27. An enclosing cover cap 45 screw-threadedly engages with the plug 19 to completely house and enclose the parts thereon. The cap 45 is provided with a vent hole 46.

When the cartridge as above described is mounted on the battery cell 10, wires 47 and 48 are run from the cartridge terminals 35 and 41 to the cell terminals 49 and 50 respectively.

Assuming the cartridge to be just positioned on the cell 10, and the cell 10 either being charged or discharging, there will be atmospheric air within the cell. There will also be accumulating a mixture of hydrogen and oxygen gases and the combined mixture will soon begin to exert a definable pressure within the cell, whereupon the gaseous mixture will push up through the rubber 16, to discharge through the passages 18 into the chamber 17.

As soon as these gases create sufficient pressure (at the present time, I employ a pressure of two inches of water) to push through the passages 21 to stretch the diaphragm 20 upwardly, the rod 24 will be carried upwardly to bring the points 28 and 29 into electrical contact, whereupon an electrical circuit is closed between the cell terminals 49 and 50 the circuit being from the terminal 49 through terminal 49 through the wire 47, the cartridge terminal 35, the resistance wire 33, up through the post 32, the arm 26, contacts 28 and 29, the arm 27, back through the conductor 43, the resistance 42, post 39, out the terminal 41, and through the wire 48 to the cell terminal 50.

Now as the cell current flows through this circuit, the resistance 33 is heated to incandescence, but as the gas mixture in the chamber 17 is not in the right proportions to form a combustible mixture due to the excess atmospheric air present from the initial closing of the cell by the cartridge, no combustion will occur and the diaphragm 20 still maintains the contact between the points 28 and 29. The resistance wire 42 is so designed that an appreciable length of time is required for it to heat up the thermostatic coil 38, and at the expiration of this time interval, the arm 37 is raised by the expansion of the coil 38 to permit the gases confined in the chamber 17 to discharge therefrom through the then uncovered passage 36, whereupon, the pressure in the chamber 17 having been reduced, the diaphragm 20 will return to its normal non-stretched position and permit the points 28 and 29 to be separated so as to break the circuit above described and permit the resistances 33 and 42 to cool off and allow the arm 37 to return to its normal closure position.

As the cell 10 still continues functioning hydrogen and oxygen are still being evolved and collect in the chamber 17 as above described. However, a combustible mixture is usually present after the expulsion of the non-combustible mixture as above outlined, and upon the circuit being established to heat the wire 33 by the required pressure, the mixture is detonated by the presence of the incandescent wire 33 before the resistance wire 42 has had time to cause the arm 37 to open the passage 36 discharge end. The product of the detonation of the gases is water which filters back through the rubber 16 to the cell 10. The diameter of the hole from which the passage 36 leads and that of the passage itself is so small, that there is no appreciable escape of gases therethrough during the infinitesimal interval of the detonation. However, should the wire 33 fail to heat, an excessive pressure would be dissipated through the passage 36 by lifting the arm 37, which serves in that case as an effectual safety-valve.

The rubber 16 contains very small interstices occasionally overlapping to form intricate passages through the rubber. This rubber 16 serves several purposes in that it prevents the electrolyte from being splashed up into the combustion chamber; serves as a cushion upon the detonation of the gases to relieve the plates in the cell from damaging pressures or vacuums; and also serves as a flame check; at the same time permitting a gradual infiltration of gases upwardly therethrough and of water backwardly thereedown.

Having described my invention in the one particular form, it is obvious that the structure may be varied considerably therefrom, such as for example the formation of a thermostat in place of the coil 38, without departing from the spirit of the invention, and I do not therefore want to be limited to the precise form as described, nor any more than may be necessitated by the following claims.

What I claim as new is:

1. For a cell containing an electrolyte from which gases may be evolved, means operative by a predetermined pressure of the gases tending to instigate a combination of the gases, and means in combination with a thermostatic control for permitting the escape of the gases when not combined through the operation of said first means.

2. For a cell containing an electrolyte from which gases may be evolved, means operative by a predetermined pressure of the gases tending to instigate a combination of the gases, and means in combination with a thermostatic control for permitting the escape of the gases when not combined through the operation of said first means, said escape means remaining inoperative for a time interval following the operation of said first means.

3. For a cell containing an electrolyte from which gases may be evolved, means operative by a predetermined pressure of the gases tending to instigate a combination of the gases, and means in combination with a thermostatic control for permitting the escape of the gases when not combined through the operation of said first means, said escape means remaining inoperative for a time interval following the operation of said first means, and the operation of said escape means rendering inoperative said first means.

4. In a cell containing an electrolyte from which gases may be evolved and confined, means tending to instigate a combination of the gases, and means in combination with a thermostatic control for permitting the escape of the gases when not combined through said first means, said escape means remaining inoperative for a time interval following the operation of said first means.

5. In a cell containing an electrolyte from which gases may be evolved and confined, a chamber receiving said gases, means within the chamber for instigating a combination of the gases, and porous elastic means between the chamber and said cell permitting a gradual equalization of pressure therebetween.

6. In a cell containing an electrolyte from which gases may be evolved and confined, a chamber receiving said gases, means within the chamber for instigating a combination of the gases, and porous elastic means between the chamber and said cell said cushion means permitting gas to pass upwardly therethrough and liquids to infiltrate downwardly therethrough.

7. In a cell containing an electrolyte from which gases may be evolved and confined, a chamber receiving said gases, and means within the chamber for instigating a combination of the gases said chamber having a discharge opening therefrom, a valve normally closing said opening, and a thermostat cooperating with said valve and said instigating means to open said valve following a predetermined period of operation of said instigating means.

8. In a cell containing an electrolyte from which gases may be evolved and confined, a chamber receiving said gases, and pressure operated means cooperating with electrical means within the chamber for instigating a combination of the gases, said chamber having a discharge opening therefrom, and a valve normally seated to close said opening, a thermostat associated with said valve, and an electrical heating element associated with the thermostat in electrical circuit with said electrical means whereby operation of said electrical means is followed by a lifting of said valve from said opening after the period of time required for said element to create sufficient heat to operate said thermostat.

9. In a cell containing an electrolyte from which gases may be evolved and confined, a chamber receiving said gases, and means within the chamber for instigating a combination of the gases said chamber having a discharge opening therefrom for elimination of gases in uncombinable proportions, a valve yieldingly seated over said opening and thermostatic means cooperating with said instigating means to lift said valve, said opening and means comprising sponge rubber between said chamber and said cell retarding a sudden change in pressure therebetween.

10. In a cell containing an electrolyte from which gases may be evolved and confined, a chamber in communication with the cell, means for detonating gases within the chamber, an electric switch controlling a flow of current to operate said detonating means and normally remaining open, means operated by pressure of the confined gases for closing the switch and means between the chamber and the cell permitting gases to pass but retarding flow of the electrolyte therethrough, said means preventing a sudden rush of gases but permitting a gradual flow in both directions therethrough.

11. In a cell containing an electrolyte from which gases may be evolved and confined, a chamber in communication with the cell, means for combining gases within the chamber, an electric switch controlling a flow of current to operate said combining means and normally remaining open, means operated by pressure of the confined gases for closing the switch, and means relieving the pressure of the gases upon failure of the gases to combine and a thermostat operating said pressure relieving means.

12. In a cell containing an electrolyte from which gases may be evolved and confined, a chamber in communication with the cell, means for combining gases within the chamber, an electric switch controlling a flow of current to operate said combining means and normally remaining open, means operated by pressure of the confined gases for closing the switch, and means relieving the pressure of the gases upon failure of the gases to combine and a thermostat operating said pressure relieving means said thermostat operating in association with the closing of said switch following a time interval thereafter.

13. In a cell containing an electrolyte from which gases may be evolved and confined, a chamber in communication with the cell, means for detonating gases within the chamber, an electric switch controlling a flow of current to operate said detonating means and normally remaining open, means operated by pressure of the confined gases for closing the switch, and means relieving the pressure of the gases upon failure of the gases to detonate and a thermostat operating said pressure relieving means said thermostat operating in association with the closing of said switch following a time interval thereafter, and said switch being opened following the operation of said pressure relieving means.

14. An electrolyte control cartridge comprising a chamber, a heating element in the chamber, an electric switch normally open, a yielding member in communication with the chamber adapted to travel under pressure from the chamber to close said switch, said chamber having a discharge passage therefrom, a clossure for said passage, a thermostat normally holding said clossure to stop said passage, and an electrical heating element associated with the thermostat in series with said switch and said chamber heating element.

In testimony whereof I affix my signature.
DEAN W. DAVIS.

CERTIFICATE OF CORRECTION.

Patent No. 1,733,335.    Granted October 29, 1929, to

DEAN W. DAVIS.

It is hereby certified that the name of the second mentioned assignee in the above numbered patent was erroneously written and printed as "Gustav R. Schnull", whereas said name should have been written and printed as "Gustav A. Schnull", as shown by the records of assignments in this office; and that the said Letters Patent should be read with this correction therein that the same may conform to the record of the case in the Patent Office.

Signed and sealed this 3rd day of December, A. D. 1929.

(Seal)

M. J. Moore,
Acting Commissioner of Patents.